United States Patent
Hahn

[15] 3,658,313
[45] Apr. 25, 1972

[54] HYDRO-PNEUMATIC SUSPENSION UNIT WITH AUTOMATIC LEVEL REGULATION

[72] Inventor: Erich Hahn, Ennepetal, Germany

[73] Assignee: Firma August Bilstein, Ennepetal, Germany

[22] Filed: Sept. 16, 1970

[21] Appl. No.: 72,718

[30] Foreign Application Priority Data

Sept. 25, 1969 Germany......................P 19 48 398.8

[52] U.S. Cl............................................................267/64
[51] Int. Cl..........................................................F16f 5/00
[58] Field of Search............................................267/66, 124

[56] References Cited

UNITED STATES PATENTS 3,426,651  2/1969  Arendorski..............................267/64
3,497,199  2/1970  Tuczek....................................267/64

Primary Examiner—James B. Marbert
Attorney—Karl F. Ross

[57] ABSTRACT

A hydro-pneumatic suspension unit with automatic level regulation in which the working liquid is completely separated from the level regulating liquid so that the working liquid does not come into contact with the pumping elements or the regulating valve. The unit includes a pressurised gas chamber which may be divided into a main chamber and a reservoir chamber so that the effective volume of gas in the main chamber can be kept constant independently of the load on the vehicle to which the suspension unit is fitted. The unit includes a motor-driven pump and a regulating valve which are both preferably located in a reservoir chamber which holds the level regulating liquid.

7 Claims, 3 Drawing Figures

PATENTED APR 25 1972

Inventor:
Erich HAHN

Karl J. Ross
Attorney

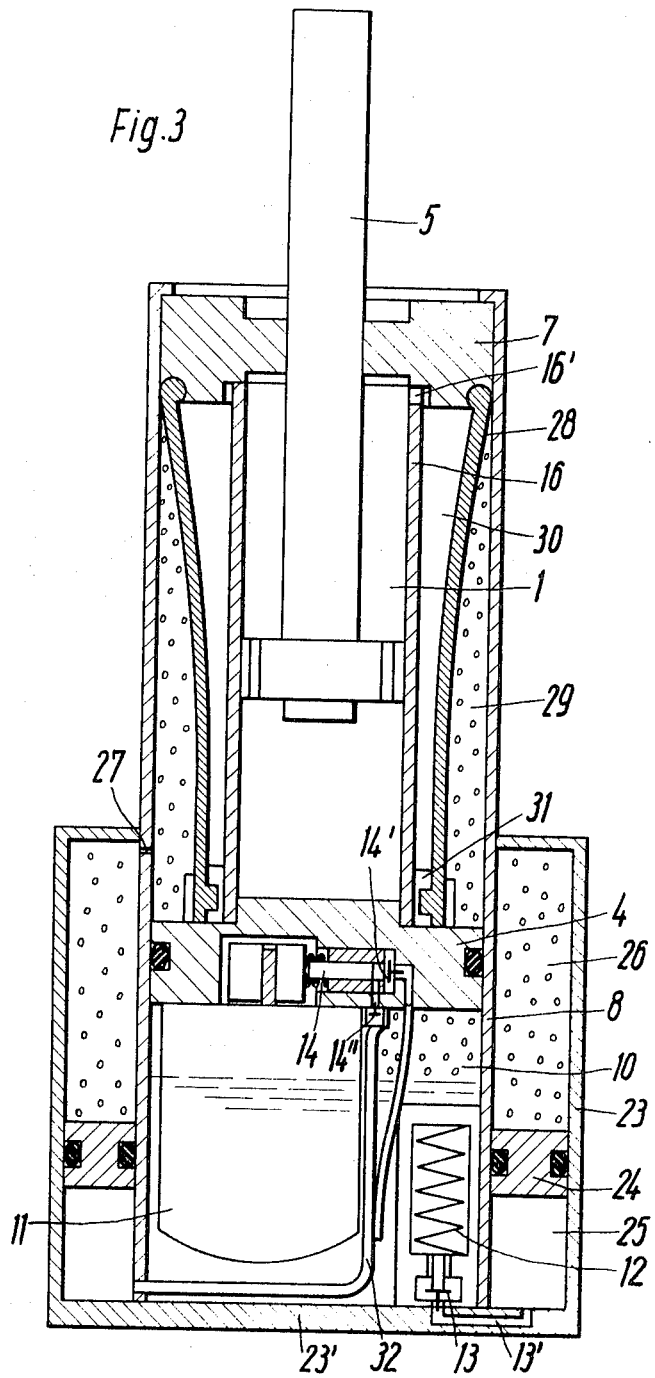

HYDRO-PNEUMATIC SUSPENSION UNIT WITH AUTOMATIC LEVEL REGULATION

This invention relates to hydro-pneumatic suspension units with automatic level regulation, particularly for use on motor vehicles.

My co-pending U.S. Pat. application Ser. No. 828297 concerns hydro-pneumatic suspension units of this type which comprise a working cylinder filled with working liquid, a working piston arranged to be slidable in the working cylinder, a piston rod secured to the working piston and having its free end projecting sealingly from the working cylinder, a pressurized gas chamber maintaining the working liquid in the working cylinder under pressure, a reservoir chamber partially filled with working liquid, a regulating valve arranged for liquid communication with the reservoir chamber, and a pump arranged for liquid communication with the reservoir chamber, the pump being driven by an electric motor which is controlled by means of a level-sensitive switch fitted into the power supply leads to the motor.

A hydro-pneumatic suspension unit of this type with automatic level regulation is of a compact, self-pumping construction and is designed to be used as an independent one-piece support member. Moreover, in contrast to other known suspension units, it can operate to being even a stationary vehicle to the desired level. This it does without the need for any hydraulic or pressurized medium pipework mounted on the vehicle, and using only a power cable connected to a power supply on the vehicle.

In the suspension unit described in the aforementioned co-pending patent application, both the pump which is driven by the electric motor and also the regulating valve are arranged between the working cylinder and the reservoir chamber so that these components are filled throughout with the working liquid, which, according to the particular conditions, is either pumped out of the reservoir chamber directly into the working cylinder or is returned from the latter into the reservoir chamber through the regulating valve. However, this arrangement has proved disadvantageous because the working liquid (damping oil) deteriorates with increasing age and becomes contaminated by particles of corrosion and the like. This impairs the working of the pump elements, particularly the valves, and of the regulating valve through which the liquid flows. Furthermore, with the relatively large temperature changes which occur in the suspension unit in use, the strong temperature dependence of the viscosity of the working liquid or damping oil has a disadvantageous effect on the efficiency of the pump which is thereby subjected to considerable variations and thus correspondingly affects the level regulation. Furthermore, in the suspension unit of the aforementioned co-pending patent application as well as in other known hydro-pneumatic suspension units there is the disadvantage that they are filled with a constant amount of pressurized gase, so that the volume thereof is subjected to severe load-dependent variations. Thus, with load changes, the characteristic curve of the gas spring varies strongly and can thereby become very progressive. If for example the maximum load is carried by the vehicle, i.e. a comparatively large load is supported by the suspension unit, then the natural frequency of the unit is very high due to the strongly progressively rising gas spring rate, and the vehicle no longer has sufficient spring comfort.

It is an object of the present invention to develop and improve the hydro-pneumatic suspension unit of the aforementioned co-pending patent application so that it retains the advantages thereof but does not have the above-mentioned faults.

This is essentially achieved in accordance with the present invention in that, in a suspension unit of the type first mentioned above, the reservoir chamber, the regulating valve, and the pump comprise a regulating liquid circuit which is separate from the working liquid and which includes a regulating liquid pressure chamber between the pump and the regulating valve, the liquid in said pressure chamber pressurizing the pressurized gas chamber by means of a displaceable separating element therebetween.

In this way, the working liquid is completely separated from the level regulating liquid so that the former does not come into contact with the pumping elements or the regulating valve. Moreover, the regulating liquid may have a different composition as compared with the working liquid, and in particular it preferably has a viscosity which is essentially independent of temperature. In this way, the pumping efficiency can be kept constant over relatively wide temperature ranges, and this means that the time taken to effect level regulation can also be kept constant.

Preferably, both the electric motor which drives the pump and also the regulating valve are located in the reservoir chamber which holds the regulating liquid and which is positioned at the end of the working cylinder opposite the end thereof from which the piston rod projects. Amongst other things, this has the advantage that the space necessary for mounting the pump motor and the regulating valve can now also be used for holding the regulating liquid. This results in a more compact construction.

According to a preferred embodiment of the invention, there is provided a separating wall dividing the pressurized gas chamber into a main gas chamber which pressurizes the working liquid and a reservoir gas chamber which is pressurized by the regulating liquid pressure chamber, the wall being provided with flow control means therein. In this way, the effective gas volume in the main gas chamber can be kept permanently constant independently of the load on the vehicle and on the suspension unit, because the amount of pressurized gas corresponding to a particular added load or reduced load flows out of the reservoir chamber into the main chamber, or vice versa, through a throttling passage or a suitably controlled valve.

In order that the invention may be fully understood two embodiments of hydro-pneumatic suspension unit according to the invention will now be described by way of example and with reference to the accompanying drawings, in which.

Figure 1:
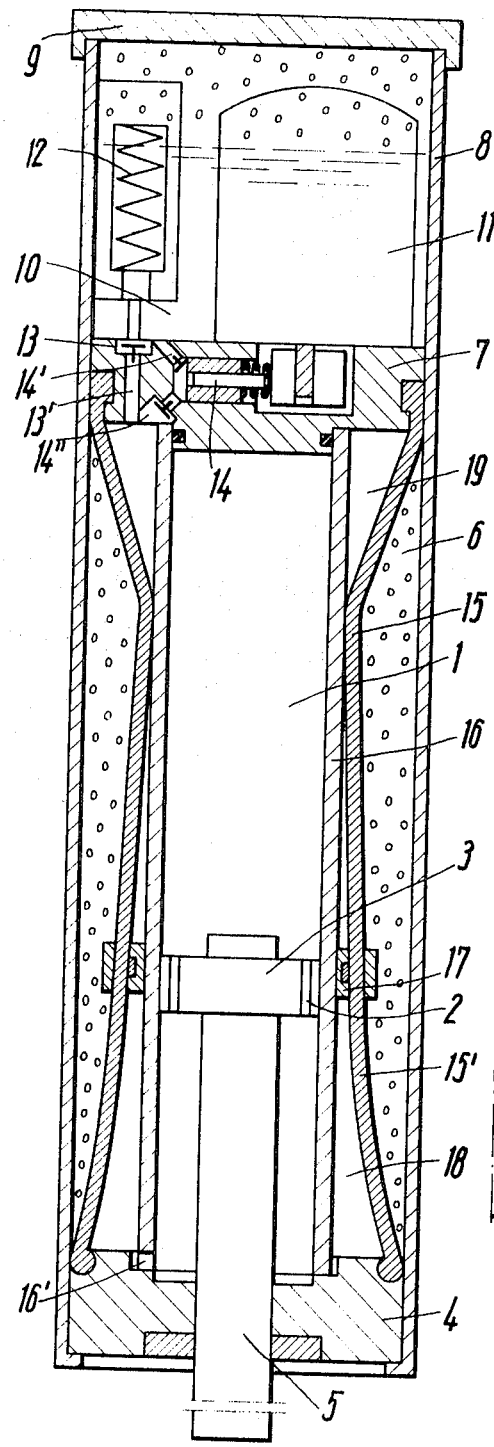
FIG. 1 is an axial longitudinal sectional view through the first embodiment of hydro-pneumatic suspension unit.

The hydro-pneumatic suspension unit with automatic level regulation illustrated in FIG. 1 essentially comprises a working cylinder 1 filled with a working liquid or suitable damping oil; a working piston 3 which is slidably displaceable in the cylinder 1 and which is provided with valve-controlled throttling passages 2; a piston rod 5 which is fixedly connected at one end to the piston 3 and which has its free end sealingly projecting from the cylinder 1 through the lower end plug 4 of the latter; a pressurized gas chamber 6 which functions to put the working liquid in the working cylinder 1 under high pressure a liquid supply chamber 10 which is positioned above the upper end plug 7 of the working cylinder 1, is enclosed by an outer housing 8 and an end cap 9, and is partially filled with regulating liquid; an electric motor 11 located in the supply chamber 10; an electromagnet 12 controlling a regulating valve 13 in the cylinder upper end plug 7; and a pump 14 which is operated by the electric motor 11 and which, together with associated inlet and outlet valves 14' and 14'', is located in the cylinder upper end plug 7. The pressurized gas chamber 6 is delimited by a tubular membrane 15 which is stretched between the cylinder end plugs 4 and 7. An annular space is created between the membrane 15 and the pipe 16 of the working cylinder. This annular space is divided by a separating wall 17, which is located approximately midway between the ends of the working cylinder and extends radially between the membrane 15 and the working cylinder pipe 16, into two liquid-tight annular chambers 18 and 19. The lower chamber 18 is in permanent communication with the interior of the working cylinder by way of a port 16' at the lower end of the cylinder pipe 16; consequently this chamber 18 is filled with working liquid and forms an expansion chamber therefor.

The upper annular chamber 19 serves as a pressure chamber for the regulating liquid and is in effective communication with the supply chamber 10 containing the regulating liquid by means of the pump valves 14', 14" on the one hand and the regulating valve passage 13' on the other hand. In this way, the regulating liquid preferably a liquid with a viscosity which is independent of temperature, in the supply chamber 10 and in the pressure chamber 19 is completely separated from the working liquid or damping oil in the working cylinder and in the expansion chamber 18.

In the event of a vehicle to which the suspension unit is fitted being additionally loaded, a return to the desired correct level is achieved by a level control switch (now shown) being thereby actuated and energizing the electric motor 11 which drives the pump 14. The pump 14 may be of the type described in the above-mentioned co-pending application. Thus, regulating liquid is passed from the supply chamber 10 to the pressure chamber 19 which causes compression of the pressurized gas in the chamber 6 via the upper part of the membrane 15. In turn, the pressurized gas then acts via the lower portion 15' of the membrane on the working liquid in the chamber 18, thereby causing this liquid, and also the liquid in the working cylinder 1, to be placed under a correspondingly higher pressure. As a result, the piston rod 5 is forced outwardly relative to the working cylinder 1 by a corresponding amount and the desired correct level is regained. If on the other hand the vehicle is unloaded, then the electromagnet 12 which is controlled by the level control switch opens the regulating valve 13 so that a corresponding volume of regulating liquid can pass from the pressure chamber 19 back into the supply chamber 10. The reduction of the gas pressure in the chamber 6 which is occasioned thereby, results in a corresponding reduction of the pressure of the working liquid, with the result that the piston rod 5 moves inwardly until the desired level is reached.

Figure 2:
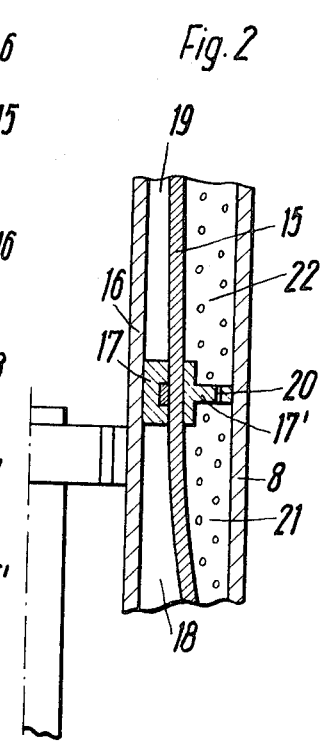
FIG. 2 is a detail view of part of the unit of FIG. 1 but with the pressurized gas chamber divided into a reservoir chamber and a main chamber; and, FIG. 3 is an axial longitudinal sectional view through the second embodiment of suspension unit.

In the modification illustrated in FIG. 2, the separating wall 17 between the working cylinder pipe 16 and the tubular membrane 15 is provided with an extension 17' which extends radially outwards to the outer housing 8 and through which a narrow throttling passage 20 is provided. By means of this extension 17' of the separating wall, the pressurized gas chamber between the membrane 15 and the housing 8 is divided into a lower main chamber 21 which exerts pressure on the working liquid in the expansion chamber 18, and a reservoir chamber 22 located above the main chamber and which is subject to the pressure in the regulating liquid pressure chamber 19. Pressurized gas can to a limited extent flow from the reservoir chamber 22 through the throttling passage 20 into the main chamber 21 and vice versa, so that in the long run the static gas pressure is the same in the two chambers. Nevertheless, essentially only the pressurized gas in the main chamber 21 is effective for the shock absorbing work which occurs during movement of the vehicle and which is caused by the relatively rapid oscillations of the piston rod 5. This pressurized gas has a permanently constant volume under either full-load or no-load conditions. In this way, the characteristic curve of the gas spring remains independent of the loading of the vehicle or of its suspension units, with the result that a corresponding improvement in comfort is achieved.

The hydro-pneumatic suspension unit illustrated in FIG. 3 is of basically the same type as that of the first embodiment. In particular, it is similarly provided with a special regulating liquid circuit which is completely separate from the working liquid or damping oil, and in addition it has a pressurized gas chamber which is divided into a main chamber and a reservoir chamber. The regulating liquid supply chamber 10, together with the electric motor 11 located therein, the electromagnet 12, and the regulating valve 13, are located here however beneath the lower working cylinder end plug 4 in which is provided only the pump 14 which is driven by the motor 11. The regulating valve 13 and the valve 13' are set in the base 23' of a cylindrical cup 23 which encircles the lower part of the housing 8. The annular space between the cylindrical cup 23 and the housing 8 is divided by a sealing annular piston 24 into two annular chambers 25 and 26. The lower chamber 25 forms the regulating liquid pressure chamber, whilst the upper chamber 26 is filled with pressurized gas and is connected by way of a throttling bore 27 in the housing 8 to the real pressurized gas main chamber 29 which exerts pressure on the working liquid through the membrane 28. In this embodiment also, the annular gas-filled chamber 26 forms a reservoir chamber for the effective pressurized gas main chamber 29. The liquid expansion chamber 30 surrounded by the membrane 28 is filled with working liquid and is in permanent communication with the interior of the working cylinder 1 by way of a port 16' at the upper end of the working cylinder pipe 16. The upper end of the working cylinder pipe 16 is connected to the housing 8 by means of the upper end plug 7. The upper end plug 7 has in its central part the sealed aperture for the piston rod 5 and at its lower peripheral edge clamps the membrane 28 which is secured at its lower end to the working cylinder pipe 16 or the lower end plug 4 by a fixing ring 31.

Again in this embodiment the spring characteristic is essentially only determined by the pressurized gas in the main chamber 29 which opposes the displaced volume of the piston rod. The throttling passage 27, which may alternatively be a valve controlled in dependence on the level of the vehicle, allows hardly any pressurized gas to pass as a result of dynamic movements of the piston rod 5, since the passage 27 is very small and has a damping effect. If, as a result of unloading the vehicle, the pressure in the main chamber 29 is reduced, the electromagnetically operated regulating valve 13 is opened by suitable pulses from a level control switch (not shown) which enables the regulating liquid to flow back from the pressure chamber 25 to the supply chamber 10. The gas reservoir chamber 26 then expands in accordance with the volume of regulating liquid which has returned to the supply chamber 10, so that the pressure in the main chamber 29 is adapted to the counteracting force of the piston rod 5 and the correct vehicle level is again obtained by an appropriate inward movement of the piston rod. The static load is also maintained constant by sufficiently sealing the outlet valve 14" of the pump 14 which is connected with the regulating liquid pressure chamber 25 by a pipe 32. In order to protect the pump valves against any impurities which may be present in the regulating liquid, a suitable filter (not shown) may be fitted in advance of the pump inlet valve 14'.

If a valve which is controlled in dependence on the vehicle level is used in place of the throttling passage 27, a higher pressure can be produced and maintained in the reservoir chamber 26 than in the main chamber 29 by means of the pump 14, the regulating liquid pressure chamber 25, and the separating piston 24. If, for example, the vehicle is unladen and thus for the level regulation the regulating valve 13 is opened as well as the valve 27 so that the regulating liquid can flow back into the supply chamber 10, then, after closing the valve 27, the pump can immediately pump regulating liquid out of the supply chamber 10 into the pressure chamber 25 so that a correspondingly higher gas pressure is produced in the then closed gas reservoir chamber 26. If the vehicle is then loaded, the pressurized gas can then immediately flow out of the reservoir chamber 26, through the then opened valve 27, and into the main chamber 29, so that the vehicle is brought to the desired level. If on the other hand only a simple throttling passage 27 is used in place of a controllable valve, in the event of loading the vehicle the pump must equalize the pressure, i.e. the level regulation then takes a specific time which is dependent on the capacity of the pump.

I claim:

1. A hydro-pneumatic suspension unit with automatic level regulation, particularly for use on motor vehicles, comprising a working cylinder filled with working liquid, a working piston arranged to be slidable in the working cylinder, a piston rod secured to the working piston and having its free end projecting sealingly from the working cylinder, a pressurized gas chamber maintaining the working liquid in the working cylinder under pressure, a reservoir chamber partially filled with working liquid, a regulating valve arranged for liquid communication with the reservoir chamber, a pump arranged for liquid communication with the reservoir chamber, an electric motor arranged to drive said pump and controlled by a level-sensitive switch fitted into the power supply leads to the motor, the reservoir chamber, the regulating valve, and the pump comprising a regulating liquid circuit which is separate from the working liquid and which includes a regulating liquid pressure chamber between the pump and the regulating valve, and a displaceable separating element between the pressure chamber and the pressurized gas chamber through which the liquid in said pressure chamber acts to pressurize the gas chamber.

2. A hydro-pneumatic suspension unit according to claim 1, wherein the regulating liquid has a different composition from the working liquid and a viscosity which is essentially independent of temperature.

3. A hydro-pneumatic suspension unit according to claim 1, wherein both the electric motor driving the pump and also the regulating valve are located in the reservoir chamber which holds the regulating liquid, and the reservoir chamber is positioned at the end of the working cylinder opposite the end thereof from which the piston rod projects.

4. A hydro-pneumatic suspension unit according to claim 1, which includes a separating wall dividing the pressurized gas chamber into a main gas chamber which pressurizes the working liquid and a reservoir gas chamber which is pressurized by the regulating liquid pressure chamber, said wall being provided with flow control means therein.

5. A hydro-pneumatic suspension unit according to claim 1, which includes a housing surrounding the working cylinder and spaced therefrom, working cylinder end closure members extending between the working cylinder and the housing, a tubular membrane constituting said displaceable separating element and mounted between the housing and the working cylinder, the membrane and the housing defining the pressurized gas chamber, and the membrane and the working cylinder defining a working liquid expansion chamber which is in permanent communication with the working liquid, a separating member extending between the membrane and the working cylinder substantially midway along the length of the membrane to provide a seal between the membrane and working cylinder, thereby defining a first annular chamber between the separating member and the cylinder end closure member through which the piston rod projects which constitutes the working liquid expansion chamber, and a second annular chamber between the separating member and the other cylinder end closure member which constitutes the regulating liquid pressure chamber, said pump being mounted in said other cylinder end closure member, said regulating liquid pressure chamber being in communication with the reservoir chamber for the regulating liquid by means of the pump and a passage of the regulating valve, and said regulating liquid reservoir chamber being located between said other cylinder end closure member and an end cover of the housing and containing the electric motor and electromagnet means operative on the regulating valve.

6. A hydro-pneumatic suspension unit according to claim 5, wherein the separating member between the working cylinder and the membrane extends radially outwardly to the housing and is provided with flow control means therein, this extension dividing the pressurized gas chamber between the membrane and the housing into a main gas chamber which pressurizes the working liquid and a reservoir gas chamber which is pressurized by the regulating liquid pressure chamber.

7. A hydro-pneumatic suspension unit according to claim 1, which includes a housing surrounding the working cylinder and spaced therefrom, working cylinder end closure members extending between the working cylinder and the housing, a tubular membrane constituting said displaceable separating element and mounted between the housing and the working cylinder, the membrane and the housing defining a main pressurized gas chamber, and the membrane and the working cylinder defining a working liquid expansion chamber which is in permanent communication with the working liquid, the regulating liquid reservoir chamber being located between the inner working cylinder end closure member and an end of the housing and containing the electric motor and electromagnet means operative on the regulating valve, housing means defining an annular chamber around said housing in the region of said liquid reservoir chamber, an annular displaceable piston in said annular chamber sealingly dividing the chamber into a first part constituting the regulating liquid pressure chamber and into a second part constituting a pressurized gas reservoir chamber which is connected to the main pressurized gas chamber by means of flow control means provided in said housing adjacent to the inner cylinder end closure member.

* * * * *